US009569528B2

(12) United States Patent
Fournier

(10) Patent No.: US 9,569,528 B2
(45) Date of Patent: Feb. 14, 2017

(54) DETECTION OF CONFIDENTIAL INFORMATION

(75) Inventor: David Fournier, Hoboken, NJ (US)

(73) Assignee: Ab Initio Technology LLC, Lexington, MA (US)

( * ) Notice: Subject to any disclaimer, the term of this patent is extended or adjusted under 35 U.S.C. 154(b) by 296 days.

(21) Appl. No.: 12/245,507

(22) Filed: Oct. 3, 2008

(65) Prior Publication Data

US 2010/0088305 A1    Apr. 8, 2010

(51) Int. Cl.
*G06F 17/30* (2006.01)
*G06F 21/55* (2013.01)
*G06Q 10/00* (2012.01)

(52) U.S. Cl.
CPC ....... *G06F 17/30675* (2013.01); *G06F 21/552* (2013.01); *G06Q 10/00* (2013.01)

(58) Field of Classification Search
None
See application file for complete search history.

(56) References Cited

U.S. PATENT DOCUMENTS

| 5,819,265 | A | 10/1998 | Ravin et al. |
| 5,850,480 | A | 12/1998 | Scanlon |
| 6,523,031 | B1 | 2/2003 | Goeser |
| 6,564,214 | B1 * | 5/2003 | Bhide .................... 707/999.006 |
| 7,835,504 | B1 * | 11/2010 | Donald et al. ............. 379/88.11 |
| 2006/0174123 | A1 | 8/2006 | Hackett et al. |
| 2007/0028297 | A1 | 2/2007 | Troyansky et al. |
| 2007/0276844 | A1 | 11/2007 | Segal et al. |
| 2008/0005106 | A1 * | 1/2008 | Schumacher et al. ............ 707/6 |
| 2008/0162225 | A1 | 7/2008 | Malcolm |
| 2009/0078757 | A1 * | 3/2009 | Hanson et al. ............... 235/380 |

(Continued)

FOREIGN PATENT DOCUMENTS

| CN | 1761958 | 4/2006 |
| JP | 2006-178603 | 7/2006 |

(Continued)

OTHER PUBLICATIONS

International Search Report & Written Opinion issued in PCT application No. PCT/US09/59240, mailed Mar. 24, 2010, 16 pages.

(Continued)

*Primary Examiner* — Sangwoo Ahn
(74) *Attorney, Agent, or Firm* — Fish & Richardson P.C.

(57) ABSTRACT

Among other aspects disclosed are a method and system for detecting confidential information. The method includes reading stored data and identifying strings within the stored data, where each string includes a sequence of consecutive bytes which all have values that are in a predetermined subset of possible values. For each of at least some of the strings, determining if the string includes bytes representing one or more format matches, wherein a format match includes a set of values that match a predetermined format associated with confidential information. For each format match, testing the values that match the predetermined format with a set of rules associated with the confidential information to determine whether the format match is an invalid format match that includes one or more invalid values and calculating a score for the stored data, based at least in part upon the ratio of a count of invalid format matches to a count of other format matches.

66 Claims, 3 Drawing Sheets

(56) References Cited

U.S. PATENT DOCUMENTS

2009/0138266 A1* 5/2009 Nagae ............................ 704/254

FOREIGN PATENT DOCUMENTS

| JP | 2006-221560 | 8/2006 |
|----|----|----|
| JP | 3814655 | 8/2006 |
| JP | 2006-268751 | 10/2006 |
| JP | 2006-293671 | 10/2006 |
| JP | 2007-004645 | 1/2007 |
| JP | 2007-507763 | 3/2007 |
| JP | 2007-241580 | 9/2007 |
| JP | 2007-287078 | 11/2007 |
| JP | 2007-323511 | 12/2007 |
| JP | 2008-011360 | 1/2008 |
| JP | 2008-026984 | 2/2008 |
| JP | 2008-102827 | 5/2008 |
| JP | 2008-117287 | 5/2008 |
| JP | 2008-234616 | 10/2008 |
| JP | 2008-541273 | 11/2008 |
| WO | WO2006/122091 | 11/2006 |
| WO | WO 2007/092455 | 8/2007 |
| WO | WO 2008/070605 | 6/2008 |

OTHER PUBLICATIONS

[Online], hstiles@beachnet.com, Credit Card Validation—Check Digits, [retrieved Jul. 14, 2009], retrieved from http://www.beachnet.com/~hstiles/cardtype.html, last revised Feb. 25, 1997.

[Online],ssa.gov, [retrieved Jul. 14, 2009], retrieved from http://www.ssa.gov/employer/ssnvs/highgroup,txt, last revised Jul. 1, 2008.

[Online], convertit.com, "North American Telephone Codes," [retrieved Jul. 14, 2009], retrieved from http://www.convertit.com/Go/ConvertIt/Reference/Telephone_Area_Codes.ASP.

[Online], United States Census Bureau, "Genealogy," [retrieved Jul. 14, 2009], retrieved from http://www.census.gov/genealogy/names/.

[Online], Kevin Atkinson, "Kevin's Word List Page," [retrieved Jul. 14, 2009], retrieved from http://wordlist.sourceforge.net/.

[Online], usps.com, "Official USPS Abbreviations," [retrieved Jul. 14, 2009], retrieved from http://www.usps.com/ncsc/lookups/usps_abbreviations.html.

[Online], aggdata.com, "AggData," [retrieved Jul. 14, 2009], retrieved from http://www.aggdata.com/free/zip-code.

[Online], Vontu, "Network Data Discovery and Protection," [retrieved Aug. 4, 2009], retrieved from http://web.archive.org/web/20071011024015/http://www.vontu.com/products/network-data-discovery-protection.asp, last revised Oct. 11, 2007.

Chinese Office Action, CN application No. 200980139094.8, mailed Jun. 3, 2013, 7 pages.

Supplementary European Search Report, EP09819679, mailed Sep. 11, 2012, 7 pages.

Japanese Office Action, with English Translation, application No. 2011-530236, mailed Nov. 21, 2013, 9 pages.

Japanese Office Action with English Translation issued in JP2014-247864 on Oct. 8, 2015 (11 pages).

Kenji Yasu et al., "Evaluation of Check System for Improper Sending of Personal Information in Encrypted Mail System" Journal of Information Processing, Information Processing Society of Japan, Aug. 15, 2005, vol. 46, No. 8, p. 1976-1983.

* cited by examiner

DETECTION OF CONFIDENTIAL INFORMATION

TECHNICAL FIELD

The invention relates to detection of confidential information.

BACKGROUND

In some data processing environments it is possible for confidential information to appear in electronic files stored in insufficiently secured data storage devices. The existence of this confidential information in insecure files can endanger the security and privacy of the individuals it is associated with and create liabilities for the entity operating the insecure data storage system. Confidential information may include sensitive financial data or any information that can be used to identify specific individuals and relate them to the contents of a file. Some examples of confidential information include names, addresses, telephone numbers, social security numbers, and credit card numbers.

SUMMARY

In a general aspect, a method for reading stored data includes: identifying strings within the stored data, where each string includes a sequence of consecutive bytes which all have values that are in a predetermined subset of possible values; for each of at least some of the strings, determining if the string includes bytes representing one or more format matches, wherein a format match includes a set of values that match a predetermined format associated with confidential information; for each format match, testing the values that match the predetermined format with a set of rules associated with the confidential information to determine whether the format match is an invalid format match that includes one or more invalid values; and calculating a score for the stored data, based at least in part upon the ratio of a count of invalid format matches to a count of other format matches.

In another general aspect, a system for detecting confidential information includes a data storage device; and a runtime environment connected to the data storage device. The runtime environment is configured to: read stored data from the data storage device; identify strings within the stored data, where each string includes a sequence of consecutive bytes which all have values that are in a predetermined subset of possible values; for each of at least some of the strings, determine if the string includes bytes representing one or more format matches, wherein a format match includes a set of values that match a predetermined format associated with confidential information; for each format match, test the values that match the predetermined format with a set of rules associated with the confidential information to determine whether the format match is an invalid format match that includes one or more invalid values; and calculate a score for the stored data, based at least in part upon the ratio of a count of invalid format matches to a count of other format matches.

In another general aspect, a computer-readable medium stores a computer program for detecting confidential information. The computer program includes instructions for causing a computer to: read stored data; identify strings within the stored data, where each string includes a sequence of consecutive bytes which all have values that are in a predetermined subset of possible values; for each of at least some of the strings, determine if the string includes bytes representing one or more format matches, wherein a format match includes a set of values that match a predetermined format associated with confidential information; for each format match, test the values that match the predetermined format with a set of rules associated with the confidential information to determine whether the format match is an invalid format match that includes one or more invalid values; and calculate a score for the stored data, based at least in part upon the ratio of a count of invalid format matches to a count of other format matches.

Aspects can include one or more of the following features:

The confidential information may be a credit card number. A format match may be determined to occur when the number of bytes with values representing digits detected in the string is equal to a number of digits in a standard format for credit card numbers. The rules associated with credit card numbers may include specification of a list of valid issuer identification numbers. The rules associated with credit card numbers may include specification of a check sum algorithm.

The confidential information may be a social security number. A format match may be determined to occur when the number of bytes with values representing digits detected in the string is equal to nine. The rules associated with social security numbers may include specification of a valid subset of values for the number represented by the first five digits of the social security number.

The confidential information may be a telephone number. A format match may be determined to occur when the number of bytes with values representing digits detected in the string is equal to ten or the number of digits detected in the string is equal to eleven digits with the first digit being "1". The rules associated with telephone numbers may include specification of a list of valid area codes. The rules associated with telephone numbers may include specification that the first digit after the area code must not be a one or a zero.

The confidential information may be a zip code. A format match may be determined to occur when a sequence of bytes is detected consisting of either five bytes with values representing digits or ten bytes with values representing nine digits with a hyphen between the fifth and sixth digits. The rules associated with telephone numbers may include specification of a list of valid five digit zip codes.

For each string, determining if the string includes one or more words that match a name, wherein a word is sequence of consecutive bytes within a string that all have values representing alpha-numeric characters, and a name is a sequence of characters from a list of such sequences that are commonly used to refer to individual people; and calculating a score for the stored data, based at least in part upon the a count of names detected in the stored data. The list of names may be divided into two subsets: first names and last names.

For each string, determining if the string includes one or more full names, wherein full names are sequences of characters consisting of a name from the list of first names followed by space and followed by a name from the list of last names; and calculating a score for the stored data, based at least in part upon the a count of full names detected.

The names in the list may each have frequency count associated with them and the average frequency count for the names occurring in the stored data may be calculated and the score for the stored data may be calculated based at least in part upon the average frequency count. The average frequency count may be disregarded if the number of names detected in the stored data is less than a threshold.

For each string, counting the number of words consisting of two letters, wherein a word is sequence of consecutive bytes within a string that all have values representing alpha-numeric characters. For each two letter word, determining if the two letter word is a valid state abbreviation; and calculating a score for the stored data based at least in part upon the count of valid state abbreviations and the count of two letter words.

For each string, determining if the string includes one or more state/zip pairs, wherein state/zip pairs are sequences of characters consisting of a state abbreviation followed by a space which in turn is followed by a zip code; and calculating a score for the stored data, based at least in part upon the a count of state/zip pairs detected.

Detecting which files in an electronically stored file system have been recently updated; and searching each of the files that has been recently updated for confidential information.

The subset of byte values that define strings may represent alphanumeric characters, parentheses, hyphen, and space.

Comparing the score to a threshold; and if the score exceeds the threshold, flagging the stored data as likely to contain confidential information.

Aspects can include one or more of the following advantages:
Allowing the search for confidential information to be automated. Efficiently detecting confidential information to enable and enhance security and privacy protection measures.

Other features and advantages of the invention will become apparent from the following description, and from the claims.

DESCRIPTION

It is desirable to be able to detect occurrences of confidential data in large sets of data, and particularly desirable to detect confidential information without requiring human agents to review large portions of the data in the course of searching for the confidential data. A system for detecting confidential information can automatically detect potential confidential data, which can then be reviewed in whole or in part by human agents. In some embodiments, human review of the confidential data might be limited to cleared personnel with scarce time or avoided entirely, thus reducing or eliminating the invasion of privacy caused by the mishandling of confidential information.

Figure 1:
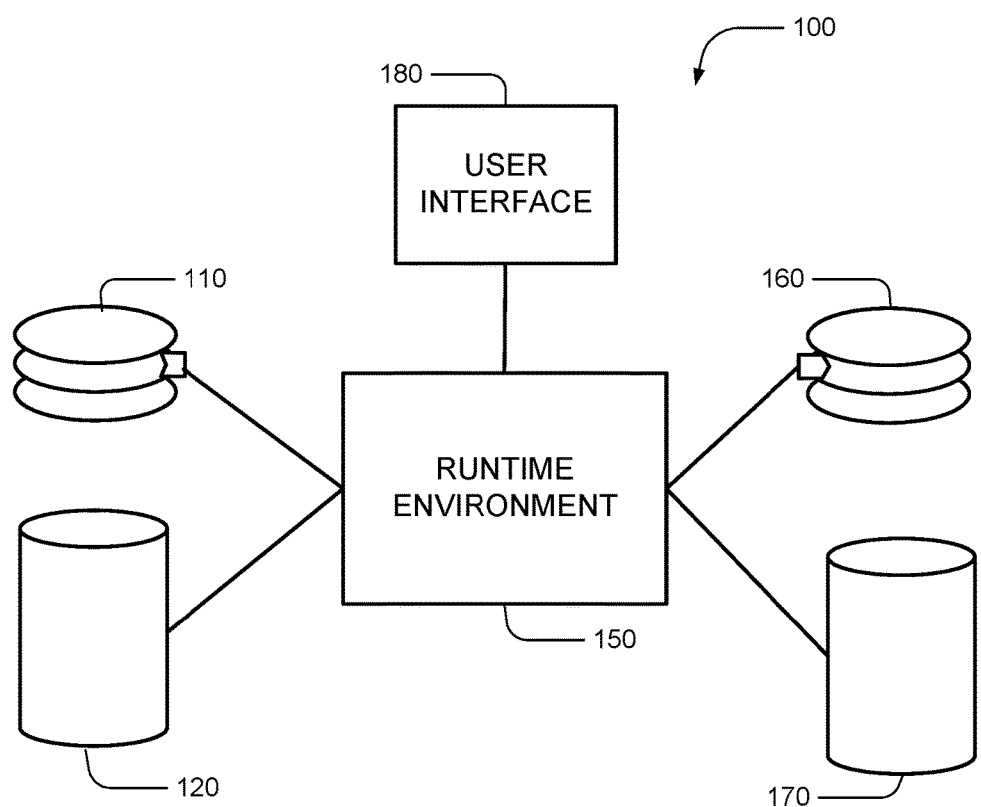
FIG. 1 is a block diagram of a system for detecting confidential information in stored data.

FIG. 1 depicts an exemplary system for detecting confidential information in electronically stored data. The data of interest may be stored in one or more data storage devices, such as a parallel "multifile" 110 implemented on multiple devices in a parallel file system (e.g., as described in U.S. Pat. No. 5,897,638, incorporated herein by reference) or a database server 120. The confidential information detection (CID) system 100 uses software executed in a runtime environment 150 to analyze stored data in the data storage device or devices. Results of the analysis, including scores for each unit of stored data, such as a file, and possibly flags indicating which units of stored data are likely to contain confidential information, may be written to the same 110, 120 or other data storage devices 160, 170. In some cases, the user interface 180 may be used by an operator to configure and control execution of the CID system as well as to review the results.

The runtime environment 150 may be hosted on one or more general-purpose computers under the control of a suitable operating system, such as the UNIX operating system. For example, the runtime environment 150 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. The input, output or intermediate data sets that are accessed by the runtime environment 150 can be a parallel "multifile" stored in a parallel file system (e.g., the data store 160, or in an external data storage 170 coupled to the system 100 locally or remotely over a communication link).

Figure 2:
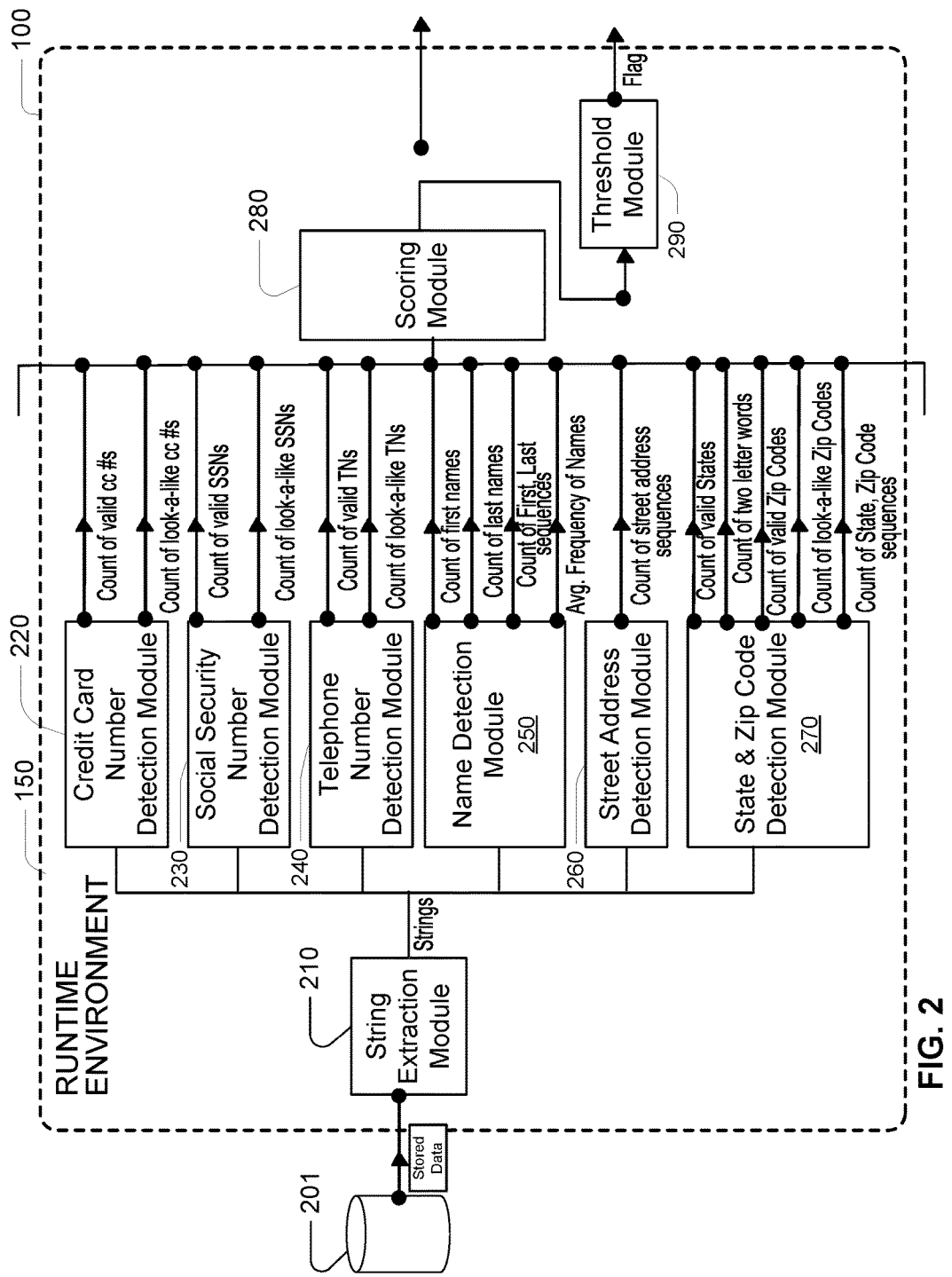
FIG. 2 is a block diagram of software used to detect confidential information in stored data.

FIG. 2 depicts a structure for software that may be executed in the runtime environment to implement a system for detecting confidential information in electronically stored files. The CID system 100 treats all file formats as unknown and searches for strings of characters that contain confidential data. A file is read from a data storage device 201. The string extraction module 210 treats the file as a sequence of bytes of data. The approach for identifying strings is to remove all bytes except bytes representing characters that are used in data representing confidential information, or the common formatting of the data representing confidential information. Bytes are typically eight bits long, but may be defined to be an arbitrary size suited to the character set sought to be detected. For example, a byte might be defined to be sixteen or thirty-two bits in length. The example system depicted uses a byte size of eight bits.

A subset of the possible byte values associated with the characters of interest is used to identify the strings. Bytes with values outside of the subset are treated as string delimiters. In this example, the byte values in the subset are the ASCII representations of alphanumeric characters, parentheses, hyphen, and space. Parentheses, hyphen, and space are included because these characters are commonly used to format things like telephone numbers, SSNs, credit cards, and between words in an address. Strings identified by the string extraction module 210 are passed to the various confidential information detection modules 220, 230, 240, 250, 260, and 270.

The credit card number detection module 220 searches each string for a number and checks that number against a set of rules associated with credit card numbers. These rules include the specification of one or more allowed credit card number lengths measured in number of digits. The module starts by searching the string for bytes representing digits. If the number of digits detected in the string is equal to the length in digits of a standardized format for credit card numbers, a basic format match is declared. Basic format matches may occur even when bytes representing other characters are interspersed between the digits representing the number, such as spaces between groups of the digits. For each basic format match, the number represented by digits in the string is tested using the full set of rules associated with credit card numbers. Other rules in the full set may include, for example, a specification of valid issuer identification numbers or a valid check sum. If the number fails to satisfy any of the rules, it is identified as an invalid, or look-a-like credit card number. As the file is processed the credit card number detection module 220 counts the number of basic format matches and the number of these that are determined to be invalid. The ratio of the count of invalid numbers to the count of other basic format matches may be related to the likelihood that the other basic format matches are in fact valid credit card numbers. In the example system, this ratio is used to weight the count of complete format matches in calculating scores.

In an alternative embodiment, a basic format match for a credit card number may be declared only when a string includes an uninterrupted sequence of bytes, each with values representing a digit, that has a length equal to the length in digits of a standardized format for credit card numbers.

Similarly, the social security number detection module 230 searches each string for a number and checks that number against a set of rules associated with social security numbers. These rules include the specification that social security numbers must be nine digits in length. The module starts by searching the string for bytes representing digits. If the number of digits detected in the string is equal to nine, a basic format match is declared. Basic format matches may occur even when bytes representing other characters are interspersed between the digits representing the number, such as hyphens between groups of the digits. For each basic format match, the number represented by digits in the string is tested using the full set of rules associated with social security numbers. Other rules in the full set may include, for example, specification of a valid subset of values for the number represented by the first five digits of the social security number. If the number fails to satisfy any of the rules, it is identified as an invalid, or look-a-like social security number. As the file is processed the social security number detection module 230 counts the number of basic format matches and the number of these that are determined to be invalid. The ratio of the count of invalid numbers to the count of other basic format matches may be related to the likelihood that the other basic format matches are in fact valid social security numbers. In the example system, this ratio is used to weight the count of complete format matches in calculating scores.

Similarly, the telephone number detection module 240 searches each string for a number and checks that number against a set of rules associated with telephone numbers. These rules include the specification that phone numbers be either ten digits in length or eleven digits in length with the first digit equal to a one. The module starts by searching the string for bytes representing digits. If the number of digits detected in the string is equal to ten or it is eleven and the first digit is a one, a basic format match is declared. Basic format matches may occur even when bytes representing other characters are interspersed between the digits representing the number, such as parentheses around the area code digits or hyphens between groups of digits. For each basic format match, the number represented by digits in the string is tested using the full set of rules associated with telephone numbers. Other rules in the full set may include, for example, a specification of valid area codes or that the first digit after the area code must not be a one or a zero. If the number fails to satisfy any of the rules, it is identified as an invalid, or look-a-like telephone number. As the file is processed the telephone number detection module 240 counts the number of basic format matches and the number of these that are determined to be invalid. The ratio of the count of invalid numbers to the count of other basic format matches may be related to the likelihood that the other basic format matches are in fact valid telephone numbers. In the example system, this ratio is used to weight the count of complete format matches in calculating scores.

In an alternative embodiment, a basic format match for a telephone number may be declared only when a string includes an uninterrupted sequence of bytes with values representing one of the following sequences:

**********
1*********
*-*-****
1-*-*-****
(*)*-****
1(*)*-**** where * is wild card representing any of the digits 0, 1, 2, 3, 4, 5, 6, 7, 8, or 9.

The name detection module 250 searches each string for words that match names from a list of common names. Here a word is a contiguous sequence of bytes that all represent letters. Such a list of common names may be derived from a government census. The list of names may be split into first names and last names. Certain names that are known to alias as commonly used words maybe excluded to lower the chances of false positives. For example the list of names might be customized to exclude the names of the months and days of the week. Another method to compensate for false positives is to monitor the average frequency of the names that occur in the file. For example, the United States census provides a frequency count for each name. Since there are very many more uncommon names than common names, most names have a frequency well below the average. A list of names may be expected to have approximately average frequency. A list of random characters that happen to hit a few names should have a much lower frequency. If the number of names detected in the file exceeds a minimum sample size, such as ten names, the average frequency of those names in the file may be calculated to test the names. The average frequency may be compared to a threshold to determine whether the names are more likely to be false positives or true names.

In the example, the name detection module 250 searches each string for first names and last names from a list of common names with associated frequencies. It also detects when a first name occurs immediately before a last name in the same string and counts such an occurrence as a full name. The module 250 outputs a count of first names, a count of last names, a count of full names, and an average frequency for all that names occurring in a file.

The street address detection module 260 searches each string for sequences of words that include a number followed by one or two words consisting of letters which in turn is followed by a recognized street abbreviation. The number at the beginning of the street address must start with a contiguous sequence of digits, with the first digit not equal to zero. This number may have an optional letter at the end before the space preceding the one or two words of the street name. The street address detection module passes a count of the number of street address sequences detected in the file to the scoring module.

The state and zip code detection module 270 searches each string for zip codes and recognized two character state abbreviations. It also counts occurrences of two word sequences consisting of a state abbreviation followed by a valid zip code. The module counts all two letter words and checks whether each two letter word is a valid state name abbreviation, as specified by the United States Post Office. The module 270 also searches each string for numbers and checks that number against a set of rules associated with zip codes. These rules include the specification that zip codes be either a sequence of contiguous digits that is five digits in length or sequence that is nine digits in length with a hyphen between the fifth and sixth digits. If a sequence of bytes matching either of these patterns is detected, a basic format match is declared. For each basic format match, the number represented by digits in the string is tested using the full set of rules associated with zip codes. Other rules in the full set may include, for example, a specification of valid five digit zip codes as a subset of all possible five digit numbers. If the number fails to satisfy any of the rules, it is identified as an invalid, or look-a-like zip code. As the file is processed the module 270 counts the number of basic format matches and the number of these that are determined to be invalid. The ratio of the count of invalid numbers to the count of other basic format matches may be related to the likelihood that the other basic format matches are in fact valid zip codes. In the example system, this ratio is used to weight the count of complete format matches in calculating scores. The module 270 finally counts the number of state and zip sequences which consist of a valid state abbreviation, followed by a space, which is followed by a valid zip code. The module 270 then passes the count of two letter words, the count of valid state abbreviations, the count of zip code format matches, the count of valid zip codes, and the count of state and zip code sequences to the scoring module.

Each file processed by the CID system is assigned a score and, depending on that score may be flagged as potentially containing confidential information. The scoring module 280 calculates the score for the file based on the outputs of the confidential information detection modules 220, 230, 240, 250, 260, and 270. The score may be saved or output from the CID system 100. The score is also passed to the thresholding module 290 which compares the score to a threshold and flags the file if its score exceeds the threshold.

While the confidential information detection modules are depicted in FIG. 2 as operating independently on the strings, it should be understood that greater efficiency might be achieved in some cases by sharing intermediate processing results for strings between some of the detection modules. For example, the results of a routine that counts the bytes in a string that represent digits could be shared by the credit card number detection module 220, the social security number detection module 230, and the telephone number detection module 240. Also, many of the detection modules might be optimized by ignoring strings with less than the minimum number of bytes required to match the format for the confidential information it is searching for. The module boundaries illustrated are intended to convey an understanding of the logic being implemented and not to impose rigid constraints on the structure of code implementing the disclosed methods in software.

Figure 3:
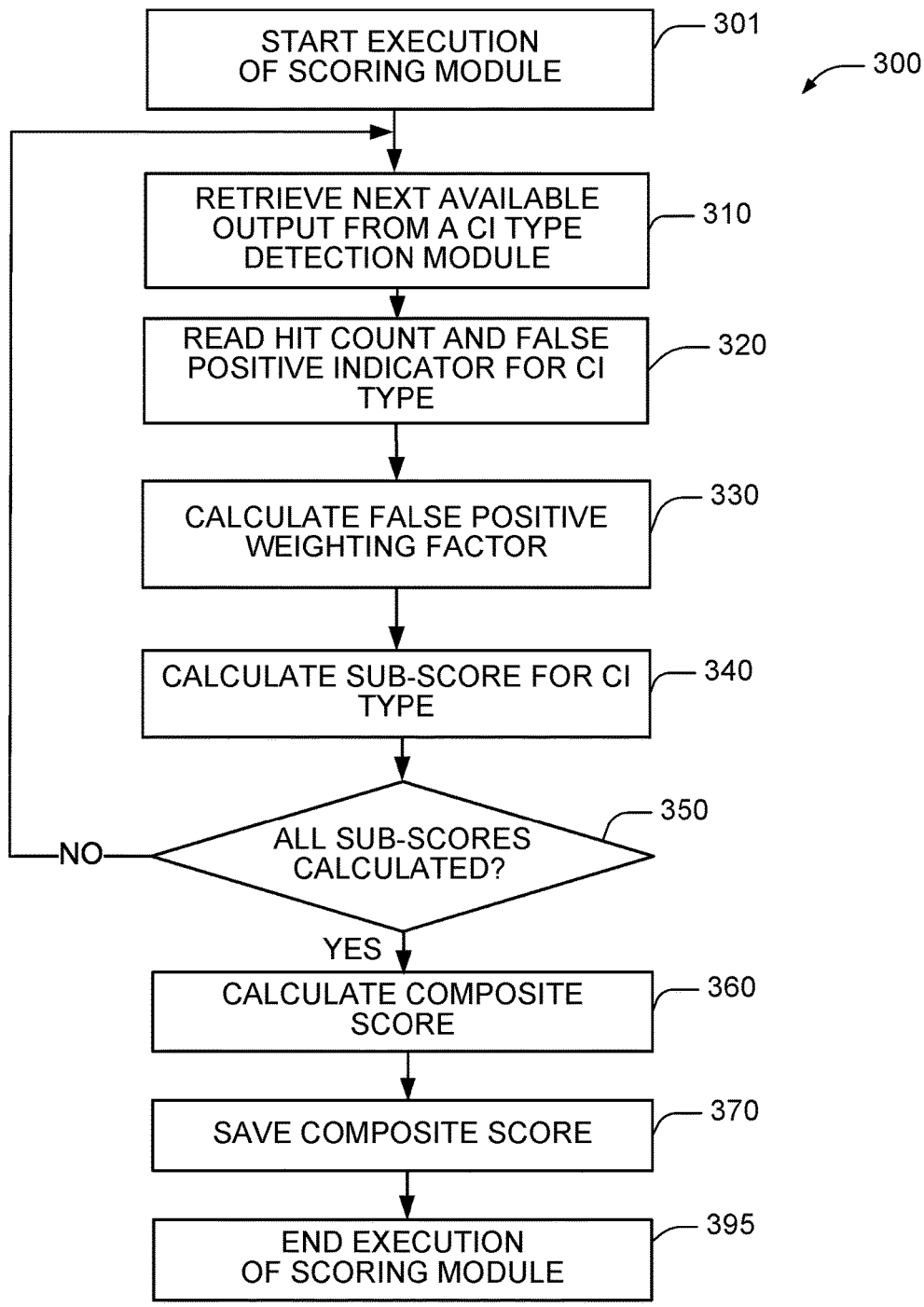
FIG. 3 is a flow chart of a process for calculating a score indicative of the likelihood that a file contains confidential information.

An exemplary scoring method 300 that may be implemented in the scoring module 280 for calculating the score is depicted in FIG. 3. After the scoring module begins execution 301, it retrieves 310 the data regarding one of the Confidential Information Types (CI Types) that has been output by one of confidential information detection modules 220, 230, 240, 250, 260, or 270. The scoring module then extracts 320 a hit count and false positive indicator for the CI Type.

The hit count is the number of matches to a CI Type format in the file that have not been determined to be invalid. For example, the hit count produced by the credit card number detection module, is the number of basic format matches not determined to be invalid. The hits are complete matches to the full set of rules associated with the CI Type. It is still possible that a hit is a false positive, as random data could include complete matches even though it does not encode information of the CI Type. A false positive indicator is a metric used by the scoring module to assess the reliability of the associate hit count. For example, the false positive indicator produced by the credit card number detection module is the count of basic format matches that are determined to be invalid. These invalid basic format matches are in a sense 'near misses' or 'look-a-like' credit card numbers and their presence may indicate a higher chance of false positives. For CI Types for which a basic format match, as distinguished from a complete match, has not been defined, other metrics may be used as a false positive indicator. For example, the average frequency count produced by the name detection module may be used a false positive indicator for name counts.

The scoring modules calculates 330 a false positive weighting factor based in part upon the false positive indicator. In this example, the weighting factor is a inversely proportional to the false positive indicator. More precisely, the weighting factor takes the form:

$$W=(H/(H+F))^n$$

where H is the hit count, F is the false positive indicator, and n is an integer exponent, usually between 1 and 5. Some false positive indicators may require other functional forms to calculate the false positive weighting factor. For example, the false positive weighting factor is directly proportional to the average frequency count for names. It may also be advantageous to take additional steps to bound the values that a weighting factor can take. For example, the weighting factor for names may be discontinuously bounded to take values between 0.5 and 1.

There may be CI Types considered in the scoring for which no false positive indicator is available. In the example system, the street address detection module produces no false positive indicator. CI Types without a false positive indicator may be factored into the scoring by skipping the false positive weighting factor calculation step 330, or equivalently by setting the weighting factor to unity or some other default value.

The scoring modules then calculates 340 a sub-score for each CI Type considered in the scoring. In the example, the sub-score is calculated as a function of the hit count, the false positive weighting factor, and a file size indicator. More precisely, the sub-score takes the form:

$$S=W*k*(H*c/N)^{1/2}$$

where N is the file size indicator and k and n are constants tuned for each CI Type to normalize the factors in the sub-score. In special cases, the form of the sub-score calculation may be simplified. For example, the detection of full names, may trigger an alternate calculation of a sub-score for names. Example code, implementing the a scoring algorithm similar to the one described, is included in the Sample Code Listing section below.

After calculating a sub-score 340, the scoring module checks 350 whether more CI Type data remains to be considered. If sub-scores have not been calculated for all the CI Types to be considered, the scoring module loops back to retrieve data from the confidential information detection module for the next CI Type. If all sub-scores have been calculated, it proceeds to calculate 360 a composite score for the file based on the sub-scores. In the example depicted, the composite score is the sum of all the sub-scores. The sub-scores may be bounded before they are added into the composite score.

The resulting composite score may then be saved 370 by, for example, writing it to non-volatile memory on a data storage device such as database server 170 or parallel "multifile" system 160. The composite score may also be passed to the threshold module 290 before termination 395 of the scoring module execution.

In some implementations the CID system 100 may be configured to process a list of one or more files provided by a user of the system. In other implementations the CID system may be configured to process all files in a file system. The CID system may be configured to run periodically and in some implementations may be configured to check timestamps associated with the files in a file system and process only those files that were recently updated (e.g., last edited after a given time, such as the last time the CID system was run).

The confidential information detection approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

Sample Code Listing

```
out::reformat(in) =
begin
letreal(8) first_name_ratio = if(in.first_name_pct == 0 orin.first_name_count <= 9) 0.5
elseif(in.first_name_pct > 0.04) 1.0 elsein.first_name_pct / 0.04;
letreal(8) last_name_ratio = if(in.last_name_pct == 0 orin.last_name_count <= 9) 0.5
elseif(in.last_name_pct > 0.006) 1.0 elsein.last_name_pct / 0.006;
letreal(8) credit_card_ratio = if(in.credit_card_count > 0) (double) in.credit_card_count /
(in.credit_card_count + in.non_credit_card_count) else 1;
letreal(8) ssn_ratio = if(in.ssn_count > 0) (double) in.ssn_count / (in.ssn_count +
in.non_ssn_count) else 1;
letreal(8) phone_ratio = if(in.phone_count > 0) (double) in.phone_count / (in.phone_count +
in.non_phone_count) else 1;
letreal(8) zip_ratio = if(in.zip_count > 0) (double) in.zip_count / (in.zip_count + in.non_zip_count)
else 1;
letreal(8) state_ratio = if(in.state_count > 0) (double) in.state_count / (in.state_count +
in.total_two_char_string_length / 2) else 1;
first_name_ratio = first_name_ratio * first_name_ratio;
ssn_ratio = ssn_ratio * ssn_ratio * ssn_ratio * ssn_ratio * ssn_ratio;
phone_ratio = phone_ratio * phone_ratio * phone_ratio * phone_ratio * phone_ratio;
zip_ratio = zip_ratio * zip_ratio * zip_ratio * zip_ratio * zip_ratio;
state_ratio = state_ratio * state_ratio * state_ratio * state_ratio * state_ratio;
out.* :: in.*;
out.name_score :: if(in.first_and_last_count > 0) math_sqrt(in.first_and_last_count) * 1000
else
    75000.0 * (math_sqrt((double) in.first_name_count * 6 / in.total_string_length) +
math_sqrt(in.first_name_count * 6 / in.total_string_length)) * first_name_ratio * last_name_ratio;
out.credit_card_score :: if(in.credit_card_count == 0) 0
else if(in.non_credit_card_count == 0) math_sqrt(in.credit_card_count) * 1000
else
(75000.0 * math_sqrt((double) in.credit_card_count * 16 / in.total_string_length)) *
credit_card_ratio;
out.ssn_score :: if(in.ssn_count == 0) 0
else if(in.non_ssn_count == 0) math_sqrt(in.ssn_count) * 1000
else
((75000.0 * math_sqrt((double) in.ssn_count * 9 / in.total_string_length)) *
ssn_ratio);
out.phone_score :: if(in.phone_count == 0) 0
```

```
else if(in.non_phone_count == 0) math_sqrt(in.phone_count) * 1000
else
((750000.0 * math_sqrt((double) in.phone_count * 10 / in.total_string_length)) *
phone_ratio);
out.zip_score :: if(in.zip_count == 0) 0
else if(in.non_zip_count == 0) math_sqrt(in.zip_count) * 1000
else
((75000.0 * math_sqrt((double) in.zip_count * 5 / in.total_string_length)) *
zip_ratio);
out.state_score :: if(in.state_count == 0) 0
else if(in.total_two_char_string_length / 2 <= in.state_count) math_sqrt(in.state_count) * 1000
else
((5000000.0 * math_sqrt((double) in.state_count * 2 / in.total_string_length)) *
state_ratio);
end;
out::reformat(in) =
begin
out.overall_score :: (if(in.first_and_last_count > 0) 1000 else min(in.name_score, 2000) / 3) +
(if(in.credit_card_score >= 1000) 1000 else min(in.credit_card_score, 2000) / 3) +
(if(in.ssn_score >= 1000) 1000 else min(in.ssn_score 2000) / 3) +
(if(in.phone_score >= 1000) 1000 else min(in.phone_score, 2000) / 3) +
(if(in.address_count > 0) 1000 else0) +
(if(in.state_and_zip_count > 0) 1000 else0) +
(if(in.zip_score >= 1000 andin.name_score >= 1000) 1000 else min(in.zip_score, 2000) / 3) +
(if(in.state_score >= 1000 andin.name_score >= 1000) 1000 else min(in.state_score, 2000) / 3);
out.username :: file_information(in.filename).username;
out.* :: in.*;
end;
      /***************   End of Code Listing   *****************/
```

Other embodiments are within the scope of the following claims.

What is claimed is:

1. A computer-implemented method for detecting confidential information, the method including:
reading, by at least one processor, stored data;
identifying, by the at least one processor, strings within the stored data, where each string includes a sequence of consecutive bytes that all have values that are in a predetermined subset of possible values;
applying, by the at least one processor, a first set of one or more rules to identify one or more format matches based on the strings, wherein each format match includes at least a portion of one of the strings that matches a predetermined format associated with a first type of confidential information;
for each determined format match, testing, by the at least one processor, the respective format match using a second set of one or more rules associated with the first type of confidential information to determine whether the format match is an invalid format match in which the portion of one of the strings that matches the predetermined format includes one or more invalid values that is or are invalid for the first type of confidential information;
determining, by the at least one processor, a first count of invalid format matches;
determining, by the at least one processor, a second count of format matches that do not include invalid values that are invalid for the first type of confidential information, in which the format matches are identified by the first set of one or more rules, and whether the format matches include invalid values is determined by the second set of one or more rules;
applying, by the at least one processor, a third set of one or more rules to each of the identified strings to determine whether there is a format match in which at least a portion of the string matches a predetermined format associated with a second type of confidential information, and producing a second set of format matches;
for each string associated with a format match in the second set of format matches, applying, by the at least one processor, a fourth set of one or more rules associated with the second type of confidential information to the string to determine whether the format match is an invalid format match in which the portion of the string matching the predetermined format associated with the second type of confidential information does not include a valid value for the second type of confidential information, and producing a second set of invalid format matches;
determining, by the at least one processor, a third count of the matches in the second set of invalid format matches for the second type of confidential information;
determining, by the at least one processor, a fourth count of matches in the second set of format matches for the second type of confidential information that do not include invalid values that are invalid for the second type of confidential information as determined according to the fourth set of one or more rules; and
flagging, by the at least one processor, the stored data as having a probability to contain confidential information based on, at least in part, a first score calculated as a function of the first count, the second count, the third count, and the fourth count.

2. The method of claim 1, wherein the confidential information is a credit card number.

3. The method of claim 2, wherein a format match is determined to occur when the number of bytes with values representing digits detected in the string is equal to a number of digits in a standard format for credit card numbers.

4. The method of claim 3, wherein the rules associated with credit card numbers include specification of a list of valid issuer identification numbers.

5. The method of claim 3, wherein the rules associated with credit card numbers include specification of a check sum algorithm.

6. The method of claim 1, wherein the confidential information is a social security number.

7. The method of claim 6, wherein a format match is determined to occur when the number of bytes with values representing digits detected in the string is equal to nine.

8. The method of claim 7, wherein the rules associated with social security numbers include specification of a valid subset of values for the number represented by the first five digits of the social security number.

9. The method of claim 1, wherein the confidential information is a telephone number.

10. The method of claim 9, wherein a format match is determined to occur when the number of bytes with values representing digits detected in the string is equal to ten or the number of digits detected in the string is equal to eleven digits with the first digit being "1".

11. The method of claim 10, wherein the rules associated with telephone numbers include specification of a list of valid area codes.

12. The method of claim 10, wherein the rules associated with telephone numbers include specification that the first digit after the area code must not be a one or a zero.

13. The method of claim 1, wherein the confidential information is a zip code.

14. The method of claim 13, wherein a format match is determined to occur when a sequence of bytes is detected consisting of either five bytes with values representing digits or ten bytes with values representing nine digits with a hyphen between the fifth and sixth digits.

15. The method of claim 14, wherein the rules associated with zip codes include specification of a list of valid five digit zip codes.

16. The method of claim 1, further including:
for each string, determining if the string includes one or more words that match a name, wherein a word is sequence of consecutive bytes within a string that all have values representing alpha-numeric characters, and a name is a sequence of characters from a list of such sequences that are commonly used to refer to individual people; and
calculating a second score for the stored data, based at least in part upon a count of names detected in the stored data.

17. The method of claim 16, wherein the list of names is divided into two subsets: first names and last names.

18. The method of claim 17, further including:
for each string, determining if the string includes one or more full names, wherein full names are sequences of characters consisting of a name from the list of first names followed by space and followed by a name from the list of last names; and
calculating a third score for the stored data, based at least in part upon a count of full names detected.

19. The method of claim 16, wherein each of the names in the list is associated with a frequency count and an average frequency count for the names occurring in the stored data is calculated and the second score for the stored data is calculated based at least in part upon the average frequency count.

20. The method of claim 19, wherein the average frequency count is disregarded if the number of names detected in the stored data is less than a threshold.

21. The method of claim 1, further including:
for each string counting the number of words consisting of two letters, wherein a word is sequence of consecutive bytes within a string that all have values representing alpha-numeric characters.

22. The method of claim 21, further including:
for each two letter word, determining if the two letter word is a valid state abbreviation; and
calculating a second score for the stored data based at least in part upon a count of valid state abbreviations and a count of two letter words.

23. The method of claim 1, further including:
for each string, determining if the string includes one or more state/zip pairs, wherein state/zip pairs are sequences of characters consisting of a state abbreviation followed by a space which in turn is followed by a zip code; and
calculating a second score for the stored data, based at least in part upon a count of state/zip pairs detected.

24. The method of claim 1, further including:
detecting which files in an electronically stored file system have been recently updated; and
applying the method of claim 1 to each of the files that has been recently updated.

25. The method of claim 1, wherein the subset of byte values that define strings represent alphanumeric characters, parentheses, hyphen, and space.

26. The method of claim 1, further including:
comparing the first score to a threshold; and
if the first score exceeds the threshold, flagging the stored data as likely to contain confidential information.

27. A system for detecting confidential information, the system including:
a data storage device; and
a runtime environment, including at least one processor, connected to the data storage device and configured to:
read stored data from the data storage device;
identify strings within the stored data, where each string includes a sequence of consecutive bytes that all have values that are in a predetermined subset of possible values;
apply a first set of one or more rules to identify one or more format matches based on the strings, wherein each format match includes at least a portion of one of the strings that matches a predetermined format associated with a first type of confidential information;
for each format match, test the respective format match using a second set of one or more rules associated with the first type of confidential information to determine whether the format match is an invalid format match in which the portion of one of the strings that matches the predetermined format includes one or more invalid values that is or are invalid for the first type of confidential information;
determine a first count representing a number of invalid format matches;
determine a second count of format matches that do not include invalid values that are invalid for the first type of confidential information, in which the format matches are identified by the first set of one or more rules, and whether the format matches include invalid values is determined by the second set of one or more rules;
apply a third set of one or more rules to each of the identified strings to determine whether there is a format match in which at least a portion of the string matches a predetermined format associated with a second type of confidential information, and producing a second set of format matches;
for each string associated with a format match in the second set of format matches, apply a fourth set of one or more rules associated with the second type of confidential information to the string to determine whether the format match is an invalid format match in which the portion of the string matching the predetermined format associated with the second type of confidential information does not include a valid value for the second type of confidential information, and producing a second set of invalid format matches;

determine a third count of the matches in the second set of invalid format matches for the second type of confidential information;

determine a fourth count of matches in the second set of format matches for the second type of confidential information that do not include invalid values that are invalid for the second type of confidential information as determined according to the fourth set of one or more rules; and flag the stored data as having a probability to contain confidential information based on, at least in part, a first score calculated as a function of the first count, the second count, the third count, and the fourth count.

28. The system of claim 27, wherein the confidential information is a credit card number, a format match is determined to occur when the number of bytes with values representing digits detected in the string is equal to a number of digits in a standard format for credit card numbers, and the rules associated with credit card numbers include specification of a list of valid issuer identification numbers and specification of a check sum algorithm.

29. The system of claim 27, wherein the confidential information is a social security number, a format match is determined to occur when the number of bytes with values representing digits detected in the string is equal to nine, and the rules associated with social security numbers include specification of a valid subset of values for the number represented by the first five digits of the social security number.

30. The system of claim 27, wherein the confidential information is a telephone number, a format match is determined to occur when the number of bytes with values representing digits detected in the string is equal to ten or the number of digits detected in the string is equal to eleven digits with the first digit being "1", and the rules associated with telephone numbers include specification of a list of valid area codes and specification that the first digit after the area code must not be a one or a zero.

31. The system of claim 27, wherein the confidential information is a zip code, a match is determined to occur when a sequence of bytes is detected consisting of either five bytes with values representing digits or ten bytes with values representing nine digits with a hyphen between the fifth and sixth digits, and the rules associated with zip codes include specification of a list of valid five digit zip codes.

32. The system of claim 27, wherein the runtime environment is further configured to:

for each string, determine if the string includes one or more words that match a name, wherein a word is sequence of consecutive bytes within a string that all have values representing alpha-numeric characters, and a name is a sequence of characters from a list of such sequences that are commonly used to refer to individual people and the list is divided into two subsets: first names and last names;

for each string, determine if the string includes one or more full names, wherein full names are sequences of characters consisting of a name from the list of first names followed by space and followed by a name from the list of last names; and calculate a second score for the stored data, based at least in part upon a count of names detected in the stored data and based at least in part upon a count of full names detected.

33. The system of claim 27, wherein the runtime environment is further configured to:

for each string, determine if the string includes one or more words that match a name, wherein a word is a sequence of consecutive bytes within a string that all have values representing alpha-numeric characters, and a name is a sequence of characters from a list of such sequences that are commonly used to refer to individual people and each of the names in the list is associated with a frequency count;

calculate the average frequency count for the names occurring in the stored data; and calculate a second score for the stored data, based at least in part upon a count of names detected in the stored data and based at least in part upon the average frequency count.

34. The system of claim 27, wherein the runtime environment is further configured to:

for each string, determine if the string includes one or more state/zip pairs, wherein state/zip pairs are sequences of characters consisting of a state abbreviation followed by a space which in turn is followed by a zip code; and calculate a second score for the stored data, based at least in part upon a count of state/zip pairs detected.

35. The system of claim 27, wherein the subset of byte values that define strings represent alphanumeric characters, parentheses, hyphen, and space.

36. A non-transitory computer-readable medium, storing a computer program for detecting confidential information, the computer program including instructions for causing a computer to:

read stored data;

identify strings within the stored data, where each string includes a sequence of consecutive bytes that all have values that are in a predetermined subset of possible values;

apply a first set of one or more rules to identify one or more format matches based on the strings, wherein each format match includes at least a portion of one of the strings that matches a predetermined format associated with a first type of confidential information;

for each format match, test the respective format match using a second set of one or more rules associated with the first type of confidential information to determine whether the format match is an invalid format match in which the portion of one of the strings that matches the predetermined format includes one or more invalid values that is or are invalid for the first type of confidential information;

determine a first count of invalid format matches;

determine a second count of format matches that do not include invalid values that are invalid for the first type of confidential information, in which the format matches are determined by the first set of one or more rules, and whether the format matches include invalid values is determined by the second set of one or more rules;

apply a third set of one or more rules to each of the identified strings to determine whether there is a format match in which at least a portion of the string matches a predetermined format associated with a second type of confidential information, and producing a second set of format matches;

for each string associated with a format match in the second set of format matches, apply a fourth set of one or more rules associated with the second type of confidential information to the string to determine whether the format match is an invalid format match in which the portion of the string matching the predetermined format associated with the second type of confidential information does not include a valid value for the second type of confidential information, and producing a second set of invalid format matches;

determine a third count of the matches in the second set of invalid format matches for the second type of confidential information;

determine a fourth count of matches in the second set of format matches for the second type of confidential information that do not include invalid values that are invalid for the second type of confidential information as determined according to the fourth set of one or more rules; and flag the stored data as having a probability to contain confidential information based on, at least in part, a first score calculated as a function of the first count, the second count, the third count, and the fourth count.

37. The computer-readable medium of claim 36, wherein the confidential information is a credit card number.

38. The computer-readable medium of claim 37, wherein a format match is determined to occur when the number of bytes with values representing digits detected in the string is equal to a number of digits in a standard format for credit card numbers.

39. The computer-readable medium of claim 38, wherein the rules associated with credit card numbers include specification of a list of valid issuer identification numbers.

40. The computer-readable medium of claim 38, wherein the rules associated with credit card numbers include specification of a check sum algorithm.

41. The computer-readable medium of claim 36, wherein the confidential information is a social security number.

42. The computer-readable medium of claim 41, wherein a format match is determined to occur when the number of bytes with values representing digits detected in the string is equal to nine.

43. The computer-readable medium of claim 42, wherein the rules associated with social security numbers include specification of a valid subset of values for the number represented by the first five digits of the social security number.

44. The computer-readable medium of claim 36, wherein the confidential information is a telephone number.

45. The computer-readable medium of claim 44, wherein a format match is determined to occur when the number of bytes with values representing digits detected in the string is equal to ten or the number of digits detected in the string is equal to eleven digits with the first digit being "1".

46. The computer-readable medium of claim 45, wherein the rules associated with telephone numbers include specification of a list of valid area codes.

47. The computer-readable medium of claim 45, wherein the rules associated with telephone numbers include specification that the first digit after the area code must not be a one or a zero.

48. The computer-readable medium of claim 36, wherein the confidential information is a zip code.

49. The computer-readable medium of claim 48, wherein a format match is determined to occur when a sequence of bytes is detected consisting of either five bytes with values representing digits or ten bytes with values representing nine digits with a hyphen between the fifth and sixth digits.

50. The computer-readable medium of claim 49, wherein the rules associated with zip codes include specification of a list of valid five digit zip codes.

51. The computer-readable medium of claim 36, further including instructions for causing a computer to:

for each string, determine if the string includes one or more words that match a name, wherein a word is a sequence of consecutive bytes within a string that all have values representing alpha-numeric characters, and a name is a sequence of characters from a list of such sequences that are commonly used to refer to individual people; and calculate a second score for the stored data, based at least in part upon a count of names detected in the stored data.

52. The computer-readable medium of claim 51, wherein the list of names is divided into two subsets: first names and last names.

53. The computer-readable medium of claim 52, further including instructions for causing a computer to:

for each string, determine if the string includes one or more full names, wherein full names are sequences of characters consisting of a name from the list of first names followed by space and followed by a name from the list of last names; and calculate a third score for the stored data, based at least in part upon a count of full names detected.

54. The computer-readable medium of claim 51, wherein each of the names in the list is associated with a frequency count and an average frequency count for the names occurring in the stored data is calculated and the second score for the stored data is calculated based at least in part upon the average frequency count.

55. The computer-readable medium of claim 54, wherein the average frequency count is disregarded if the number of names detected in the stored data is less than a threshold.

56. The computer-readable medium of claim 36, further including instructions for causing a computer to:

for each string count the number of words consisting of two letters, wherein a word is a sequence of consecutive bytes within a string that all have values representing alpha-numeric characters.

57. The computer-readable medium of claim 56, further including instructions for causing a computer to:

for each two letter word, determine if the two letter word is a valid state abbreviation; and calculate a second score for the stored data based at least in part upon a count of valid state abbreviations and a count of two letter words.

58. The computer-readable medium of claim 36, further including instructions for causing a computer to:

for each string, determine if the string includes one or more state/zip pairs, wherein state/zip pairs are sequences of characters consisting of a state abbreviation followed by a space which in turn is followed by a zip code; and calculate a second score for the stored data, based at least in part upon a count of state/zip pairs detected.

59. The computer-readable medium of claim 36, further including instructions for causing a computer to:

detect which files in an electronically stored file system have been recently updated; and apply each step of claim 36 to each of the files that has been recently updated.

60. The computer-readable medium of claim 36, wherein the subset of byte values that define strings represent alphanumeric characters, parentheses, hyphen, and space.

61. The computer-readable medium of claim 36, further including instructions for causing a computer to:
compare the first score to a threshold; and
if the first score exceeds the threshold, flag the stored data as likely to contain confidential information.

62. A computer-implemented method for detecting confidential information, the method including:
reading, by at least one processor, stored data;
identifying, by the at least one processor, strings within the stored data, where each string includes a sequence of consecutive bytes which all have values that are in a predetermined subset of possible values;
identifying, by the at least one processor, format matches based on the strings, wherein each format match includes at least a portion of one of the strings that matches a predetermined format associated with a first type of confidential information;
for each determined format match, testing, by the at least one processor, the respective format match using a set of rules associated with the first type of confidential information to determine whether the portion of one of the strings that matches the predetermined format includes one or more invalid values for the first type of confidential information;
determining, by the at least one processor, a first count of the number of the format matches in which for each such format match, the portion of one of the strings that matches the predetermined format includes one or more invalid values for the first type of confidential information according to the rules;
determining, by the at least one processor, a second count of the number of the determined format matches that do not include invalid values for the first type of confidential information according to the rules; and
flagging, by the at least one processor, the stored data as likely to contain confidential information based, at least in part, on a comparison of the first count to the second count,
wherein flagging the data as likely to contain confidential information is based at least in part upon the first count being small enough relative to the second count for a score that depends on the first and second counts to exceed a threshold.

63. A computer-implemented method for detecting confidential information, the method including:
reading, by at least one processor, stored data;
identifying, by the at least one processor, strings within the stored data, where each string includes a sequence of consecutive bytes that all have values that are in a predetermined subset of possible values;
applying, by the at least one processor, a first set of one or more rules to each of the identified strings to determine whether there is a format match in which at least a portion of the string matches a predetermined format associated with a first type of confidential information, and producing a first set of format matches;
for each string associated with a format match in the first set of format matches, applying, by the at least one processor, a second set of one or more rules associated with the first type of confidential information to the string to determine whether the format match is an invalid format match in which the portion of the string matching the predetermined format associated with the first type of confidential information does not include a valid value for the first type of confidential information, and producing a first set of invalid format matches;
calculating, by the at least one processor, a first count of the matches in the first set of invalid format matches for the first type of confidential information;
calculating, by the at least one processor, a second count of matches in the first set of format matches that do not include invalid values that are invalid for the first type of confidential information as determined according to the second set of one or more rules;
applying, by the at least one processor, a third set of one or more rules to each of the identified strings to determine whether there is a format match in which at least a portion of the string matches a predetermined format associated with a second type of confidential information, and producing a second set of format matches;
for each string associated with a format match in the second set of format matches, applying, by the at least one processor, a fourth set of one or more rules associated with the second type of confidential information to the string to determine whether the format match is an invalid format match in which the portion of the string matching the predetermined format associated with the second type of confidential information does not include a valid value for the second type of confidential information, and producing a second set of invalid format matches;
calculating, by the at least one processor, a third count of the matches in the second set of invalid format matches for the second type of confidential information;
calculating, by the at least one processor, a fourth count of matches in the second set of format matches for the second type of confidential information that do not include invalid values that are invalid for the second type of confidential information as determined according to the fourth set of one or more rules; and
flagging, by the at least one processor, the stored data as likely to contain confidential information based on, at least in part, a score calculated as a function of the first count, the second count, the third count, and the fourth count.

64. The method of claim 63 in which the first type of confidential information includes social security numbers, and determining a first count includes determining the number of strings that have 9-digit numbers that are not valid social security numbers.

65. The method of claim 63 in which the first type of confidential information includes telephone numbers, and determining the first count includes determining the number of strings that have 10-digit or 11-digit numbers that are not valid telephone numbers.

66. The method of claim 63 in which the first and second types of confidential information are selected from at least two of social security number, telephone number, credit card number, zip code, name, or state abbreviation.

\* \* \* \* \*